United States Patent [19]

Swanner

[11] Patent Number: 5,620,040
[45] Date of Patent: Apr. 15, 1997

[54] FOLDABLE CARGO COVER

[75] Inventor: James A. Swanner, Laguna Niguel, Calif.

[73] Assignee: Performance Marketing, Inc., Santa Ana, Calif.

[21] Appl. No.: 626,912

[22] Filed: Apr. 3, 1996

Related U.S. Application Data

[63] Continuation of Ser. No. 311,388, Sep. 22, 1994, abandoned.

[51] Int. Cl.⁶ .............................. A47H 23/00; B60P 7/02
[52] U.S. Cl. .................. 160/354; 160/264; 160/377; 160/379; 296/100; 296/118
[58] Field of Search ..................... 160/264, 328, 160/354, 368.1, 371, 377, 372, 379, 380, 381, 388, 390; 296/100, 118, 122, 99.1, 119, 120.1, 130

[56] References Cited

U.S. PATENT DOCUMENTS

| | | | |
|---|---|---|---|
| 2,305,468 | 12/1942 | Ferrigno | 160/354 |
| 4,834,160 | 5/1989 | Becker | 160/66 |
| 5,050,924 | 9/1991 | Hansen | 296/100 |
| 5,066,063 | 11/1991 | Mullally | 296/100 |
| 5,099,905 | 3/1992 | Rigter | 160/273.1 |

*Primary Examiner*—Kenneth J. Dorner
*Assistant Examiner*—Bruce A. Lev
*Attorney, Agent, or Firm*—Price, Gess & Ubell

[57] ABSTRACT

A foldable cargo cover comprising a pliable sheet having a plurality of elongate stiffener members attached thereto at selected locations thereon. The stiffener members are of sufficient rigidity to maintain the sheet in a substantially planar configuration when fully unfolded, and bendable for allowing the sheet to be folded into a compact configuration.

13 Claims, 5 Drawing Sheets

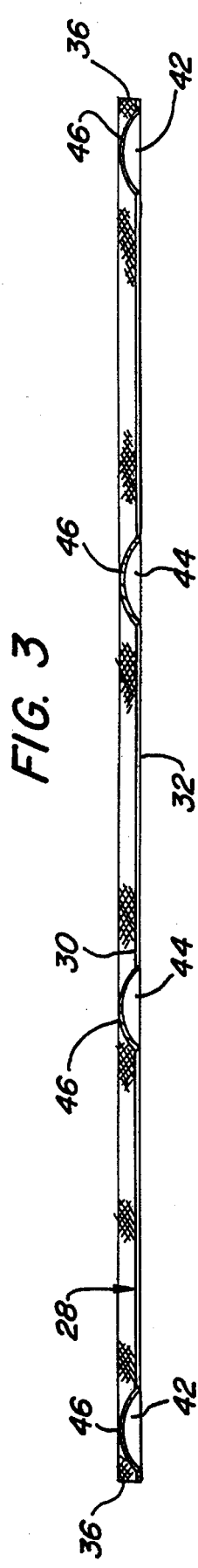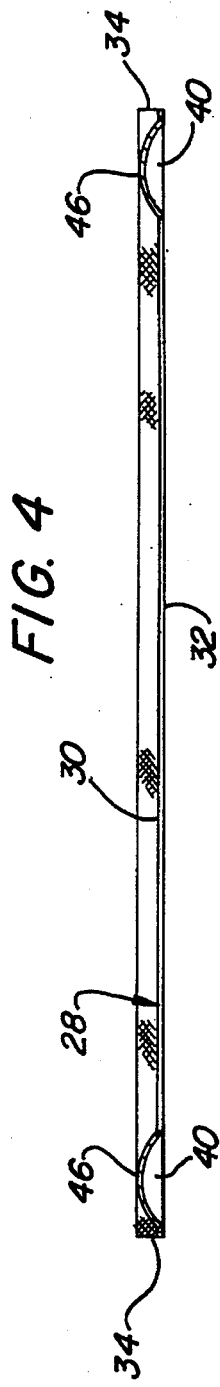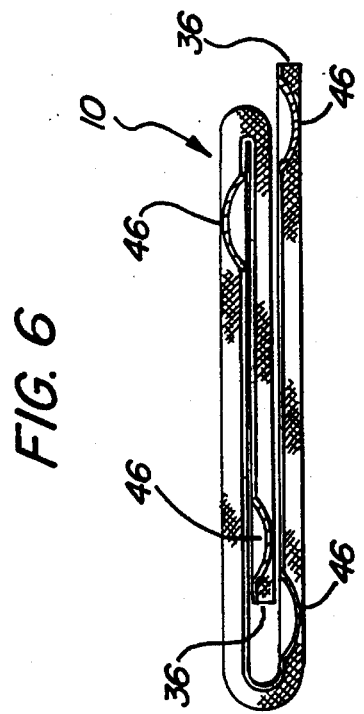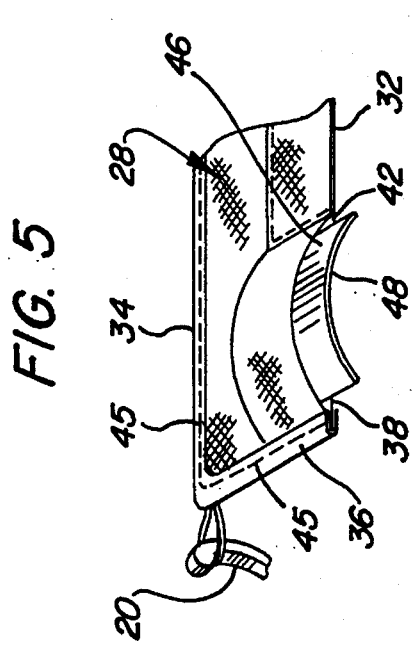

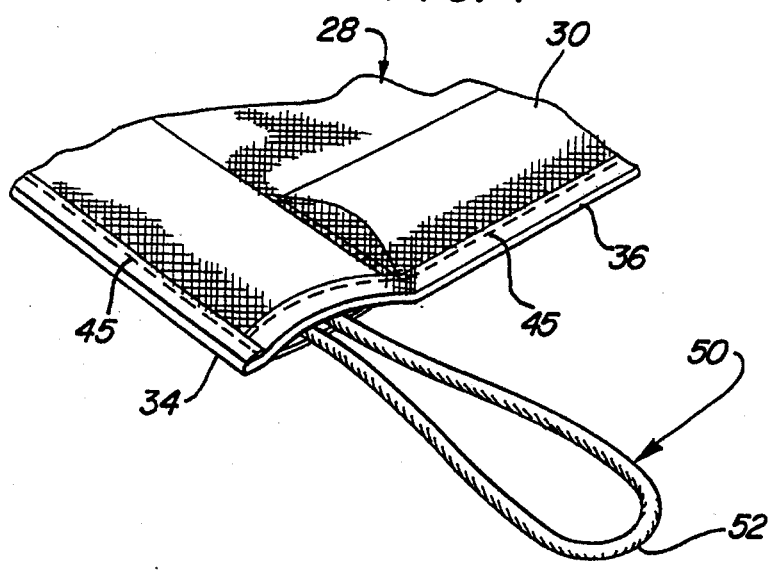
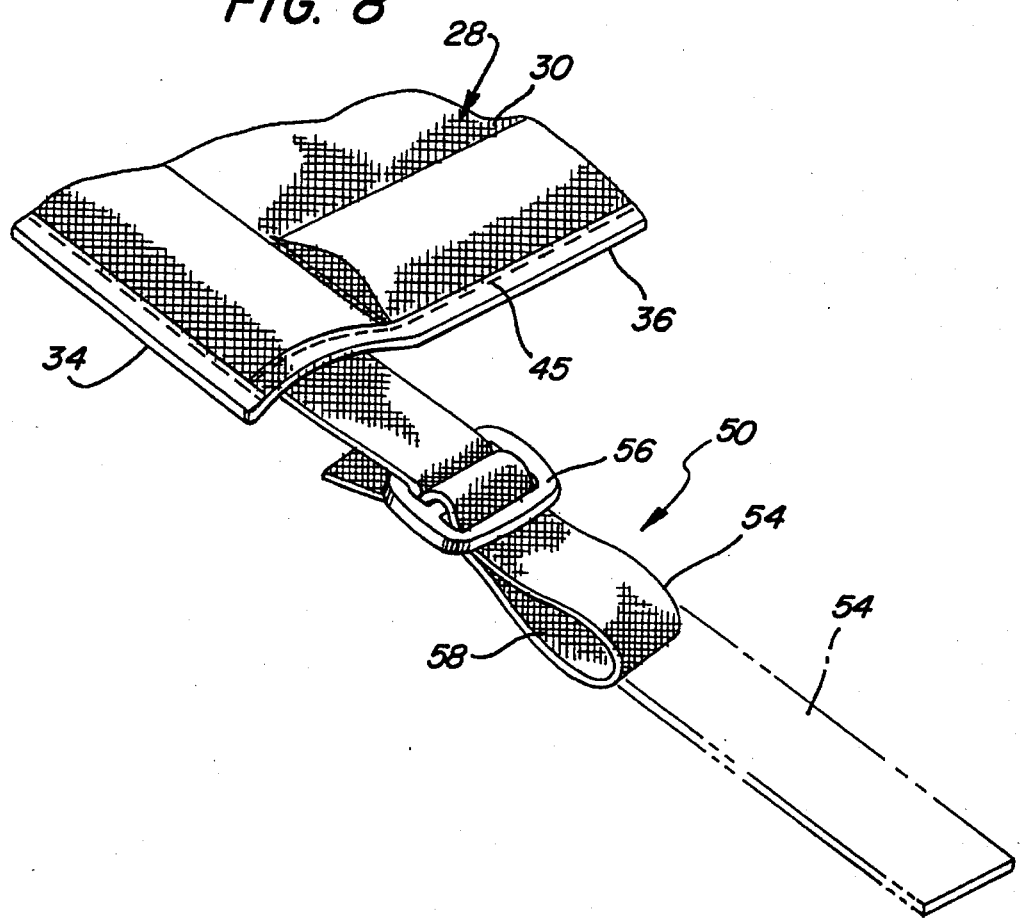

FOLDABLE CARGO COVER

This is a continuation application of application Ser. No. 08/311,388, filed on Sep. 22, 1994, now abandoned, for a FOLDABLE CARGO COVER.

FIELD OF THE INVENTION

The present invention relates generally to motor vehicles, and more particularly to a foldable cover for visible cargo spaces in the rear of a vehicle.

BACKGROUND OF THE INVENTION

In many types of motor vehicles, and in particular utility vehicles such as sports vans, sports wagons and station wagons, it is known to provide a cargo area which is located in the passenger compartment of the vehicle immediately behind the rear seat. A rear hatch or rear cargo door is typically used to provide access to the cargo area. In certain vehicles, the seat back of the rear seat may be folded forward, or the rear seat completely removed from within the vehicle, to increase the size of the cargo area.

A significant problem which arises when storing cargo within the cargo area is that such cargo is totally visible to anyone who looks through the vehicle windows, and particularly the window included in the rear hatch back door. As will be recognized, the fact that the cargo is visible adds to or creates the temptation for persons to break into the vehicle and steal such cargo, particularly if it is apparent that the cargo is relatively costly or valuable.

In recognition of the risks associated with allowing the cargo stored within the cargo area to be openly viewed, it has become a common practice for those vehicles which include a cargo area to be provided with a flexible screen or rigid plastic cover which is suspended above the cargo area floor and used to conceal from sight the contents of the cargo area. Though these flexible screens or rigid covers prevent persons on the outside of the vehicle from viewing the contents of the cargo area through the vehicle windows, such screens and covers possess certain deficiencies which detract from their overall utility and marketability.

In particular, the rigidity of those covers which are fabricated from plastic or similar materials makes the removal thereof from within the cargo area and subsequent re-installation into the cargo area both a difficult and time consuming procedure. Additionally, once such covers are removed from within the cargo area, the size and rigidity thereof necessitates the need for a large storage space to accommodate the same, thus making storage within the vehicle itself virtually impossible. The flexible screens known in the prior art are typically provided in the form of a flexible sheet of material (such as cloth or vinyl) which is retractably mounted to a reel. The reel is typically mounted on the back of the rear seat, with the flexible sheet being selectively extendable over the cargo area and into releasable attachment to a portion of the vehicle body behind the rear seat. However, when fully extended and suspended over the cargo area, the flexible sheet is susceptible to sagging and fluttering, thus giving the same an unsightly appearance. The present invention overcomes these and other deficiencies associated with the prior art by providing a foldable cargo cover which is maintained in a substantially planar, non-sagging configuration when fully unfolded and suspended over the cargo area, and is foldable into a compact configuration when removed from within the cargo area, thus allowing for its subsequent compact storage in the vehicle as well as a compact configuration for retail marketing purposes.

SUMMARY OF THE INVENTION

In accordance with the present invention, there is provided a foldable cargo cover which comprises a pliable sheet having a plurality of elongate stiffener members attached thereto at selected locations thereon. The sheet has a substantially rectangular configuration or configuration generally commensurate with the vehicle cargo area and defines opposed longitudinal side edges and opposed lateral side edges. A first pair of stiffener members extend along respective longitudinal side edges of the sheet, with a second pair of stiffener member extending along respective lateral side edges of the sheet. Additionally, third stiffener member(s) extend perpendicularly in spaced relation between the first pair of stiffener members. In the preferred embodiment, the sheet defines a plurality of elongate pockets which are sized and configured to receive respective ones of the stiffener members of the first, second and third pairs, with the stiffener members being sealed within the pockets. The stiffener members are of sufficient rigidity to maintain the sheet in a substantially planar configuration when fully unfolded, and bendable for allowing the sheet to be folded into a compact configuration.

The cargo cover further comprises plural, preferably four (4) elongate fastener members which are attached to respective corners of the sheet. Each of the fastener members preferably comprises an elongate strap having one end attached to the sheet and a buckle or piece of hook and loop fastener disposed thereon. In an alternative embodiment of the present invention, the fastener members each comprise an elongate, elastic cord having opposed ends which are attached to the sheet in a manner causing the cord to assume a loop-like configuration. However, those skilled in the art will recognize that alternative invention fasteners are contemplated herein.

Each of the stiffener members incorporated into the cargo cover preferably has an arcuately contoured cross-sectional configuration and is fabricated from plastic. Additionally, the sheet is preferably fabricated from a polymer surface such as nylon or vinyl, the bottom surface of which is preferably coated with a layer of rubberized material.

BRIEF DESCRIPTION OF THE DRAWINGS

These, as well as other features of the present invention, will become more apparent upon reference to the drawings wherein:

FIG. 3 is a cross-sectional taken along line 3—3 of FIG. 1;

FIG. 4 is a cross-sectional view taken along line 4—4 of FIG. 1;

FIG. 5 is a cross-sectional view taken along line 5—5 of FIG. 1;

FIG. 6 is a cross-sectional view illustrating the cargo covers shown in FIGS. 1 and 2 in a folded configuration;

FIG. 7 is an enlarged view of the region encircled in FIG. 1, illustrating one embodiment of a fastener member included with the cargo cover;

FIG. 8 is a perspective view of a fastener member which may be included with the cargo cover as an alternative to the fastener member shown in FIG. 7.

DETAILED DESCRIPTION OF THE PREFERRED EMBODIMENTS

Figure 1:
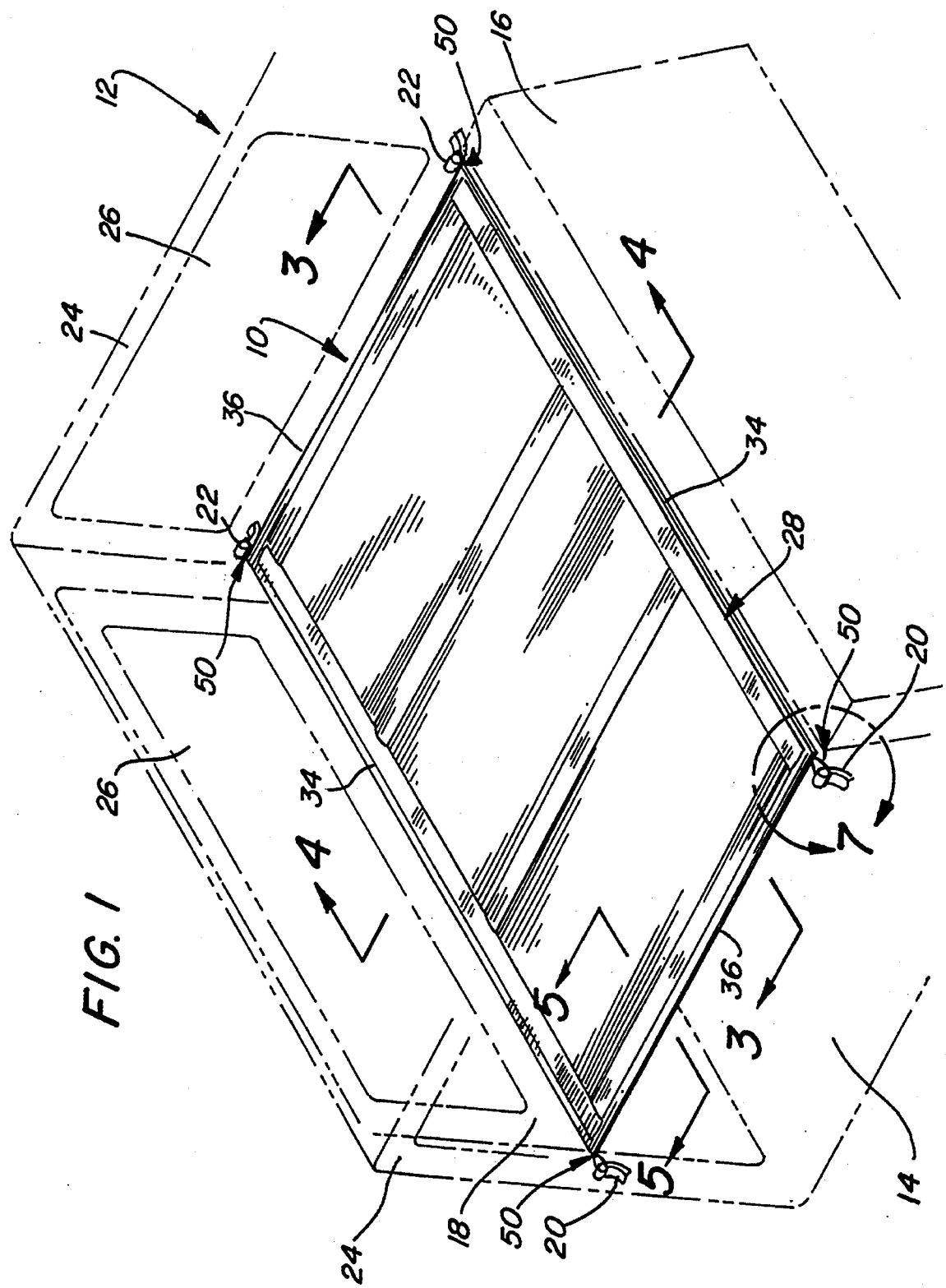
FIG. 1 is a front perspective view of a cargo cover constructed in accordance with a first embodiment of the present invention.

Referring now to the drawings where the showings are for purposes of illustrating preferred embodiments of the present invention only, and not for purposes of limiting the same, FIG. 1 perspectively illustrates a foldable cargo cover 10 constructed in accordance with a first embodiment of the present invention. The cargo cover 10 is typically used in a motor vehicle 12 (shown in phantom FIG. 1) such as a sports van, sports wagon or station wagon, which is provided with a cargo area 14 located in the passenger compartment of the vehicle 12 immediately behind the rear seat 16 thereof. Typically, the cargo area 14 is accessed via a rear door 18 of the vehicle 12. As will be explained in more detail below, the cargo cover 10 is suspended over the cargo area 14 via the attachment thereof to first and second pairs of hook members 20, 22 which extend inwardly from the opposed sidewalls 24 of the vehicle 12. As will be recognized, the suspension of the cargo cover 10 over the cargo area 14 prevents any cargo stored within the cargo area 14 from being visually observed through the windows 26 disposed within the hatchback door 18 and sidewalls 24 of the vehicle 12.

Referring now to FIGS. 1 and 3–5, the cargo cover 10 constructed in accordance with the first embodiment comprises a pliable sheet 28 which is preferably fabricated from nylon and defines a top surface 30 and a bottom surface 32. The bottom surface 32 of the sheet 28 is preferably coated with a layer of rubberized material. The sheet 28 preferably has a substantially rectangular configuration and defines opposed longitudinal side edges 34 and opposed lateral side edges 36.

Attached to the bottom surface 32 of the sheet 28 at selected locations thereon are a plurality of elongate strips 38 which are also preferably fabricated from nylon. In the first embodiment, a first pair of strips 38 is attached to the bottom surface 32 in a manner defining a first pair of elongate pockets 40 which extend along respective longitudinal side edges 34 of the sheet 28. A second pair of strips 38 is attached to the bottom surface 32 in a manner defining a second pair of pockets 42 which extend along respective lateral side edges 36 of the sheet 28. A third pair of strips 38 is also attached to the bottom surface 32 in a manner defining a third pair of pockets 44 which extend perpendicularly in spaced relation between the pockets 40. As best seen in FIG. 3, the pockets 44 are separated from each other and from the pockets 42 by equidistantly spaced intervals. Additionally, as seen in FIGS. 5, 7 and 8, the strips 38 are each preferably attached to the bottom surface 32 of the sheet 28 via stitching 45.

In addition to the sheet 28, the cargo cover 16 further comprises a plurality of elongate stiffener members 46, each of which is preferably fabricated from plastic and has an arcuately contoured cross-sectional configuration. In the cargo cover 10, a first pair of stiffener members 46 is inserted into respective ones of the pockets 40, with a second pair of stiffener members 46 being inserted into respective ones of the pockets 42. Additionally, a third pair of stiffener members 46 is inserted into respective ones of the pockets 44. As will be recognized, the lengths of the individual stiffener members 46 are substantially equal to the lengths of the respective pockets 40, 42, 44 into which they are inserted. As best seen in FIG. 1, due to the orientation of the pockets 42, 44 on the bottom surface 32 of the sheet 28, the stiffener members 46 which are inserted thereinto are of substantially equal lengths. The stiffener members 46 are inserted into their respective pockets 40, 42, 44 in a manner wherein the concave inner surfaces 48 thereof are directed toward the strips 38, and hence the bottom surface 32 of the sheet 28. The stiffener members 46 are preferably sealed within the pockets 40, 42, 44 subsequent to being inserted therein, thus making the stiffener members 46 integral with the sheet 28.

Advantageously, the stiffener members 46 are of sufficient rigidity to maintain the sheet 28 in a substantially planar configuration when fully unfolded, as seen in FIG. 1. Additionally, the stiffener members 46 are bendable for allowing the sheet 28 to be folded into a compact configuration, as seen in FIG. 6. Typically, the sheet 28 is folded by turning one of the lateral side edges 36 inwardly such that approximately one-third of the sheet 28 overlaps the remaining two-thirds thereof. Thereafter, the other lateral side edge 36 is turned inwardly so as to cause the remaining two-thirds of the sheet 28 to overlap the previously folded portion thereof. As such, when the sheet 20 is folded, only the stiffener members 46 inserted into the first pair of pockets 40 will be bent, with such bending occurring in two separate locations along the length thereof. Importantly, when the sheet 28 is fully unfolded, the stiffener members 46, and in particular those inserted into the first pair of pockets 40, immediately reassume assume their arcuate configuration, thus imparting sufficient rigidity to the sheet 28 to maintain the same in a substantially planar configuration. It will be recognized that alternative methods may be utilized to fold the sheet 28, including the bending of the stiffener members 46 inserted into the second and third pairs of pockets 42, 44. Advantageously, when the cargo cover 10 is folded into a compact configuration in the aforementioned manner, the same may be stored directly within the passenger compartment of the vehicle 12.

As previously explained, the cargo cover 10 is typically suspended above the cargo area 14 of the vehicle 12 via the attachment thereof to the hook members 20, 22 disposed on the opposed sidewalls 24 of the vehicle 12. To facilitate such attachment, the cargo cover 10 comprises four (4) elongate fastener members 50 which are attached to respective corners of the sheet 28. As best seen in FIG. 7, in a first embodiment of the present invention each of the fastener members 50 comprises an elongate, elastic cord 52 having opposed ends which are attached to the sheet 28 in a manner causing the cord 52 to assume a loop-like configuration. As seen in FIG. 1, each lateral side edge 36 of the sheet 28 includes a pair of cords 52 extending therefrom which are extensible over respective ones of the hook members 20, 22.

Referring now to FIG. 8, the fastener members 50 may also each comprise an elongate strap 54 having one end attached to the sheet 28 and a buckle 56 disposed thereon. Each strap 54 is extended about a respective one of the hook members 20, 22, with the distal end thereof subsequently being inserted through the buckle 56. Alternatively, the distal end of the strap 54 may be extended through the buckle 56 so as to define a loop 58 which is extensible over a respective one of the hook members 20, 22.

Figure 9:
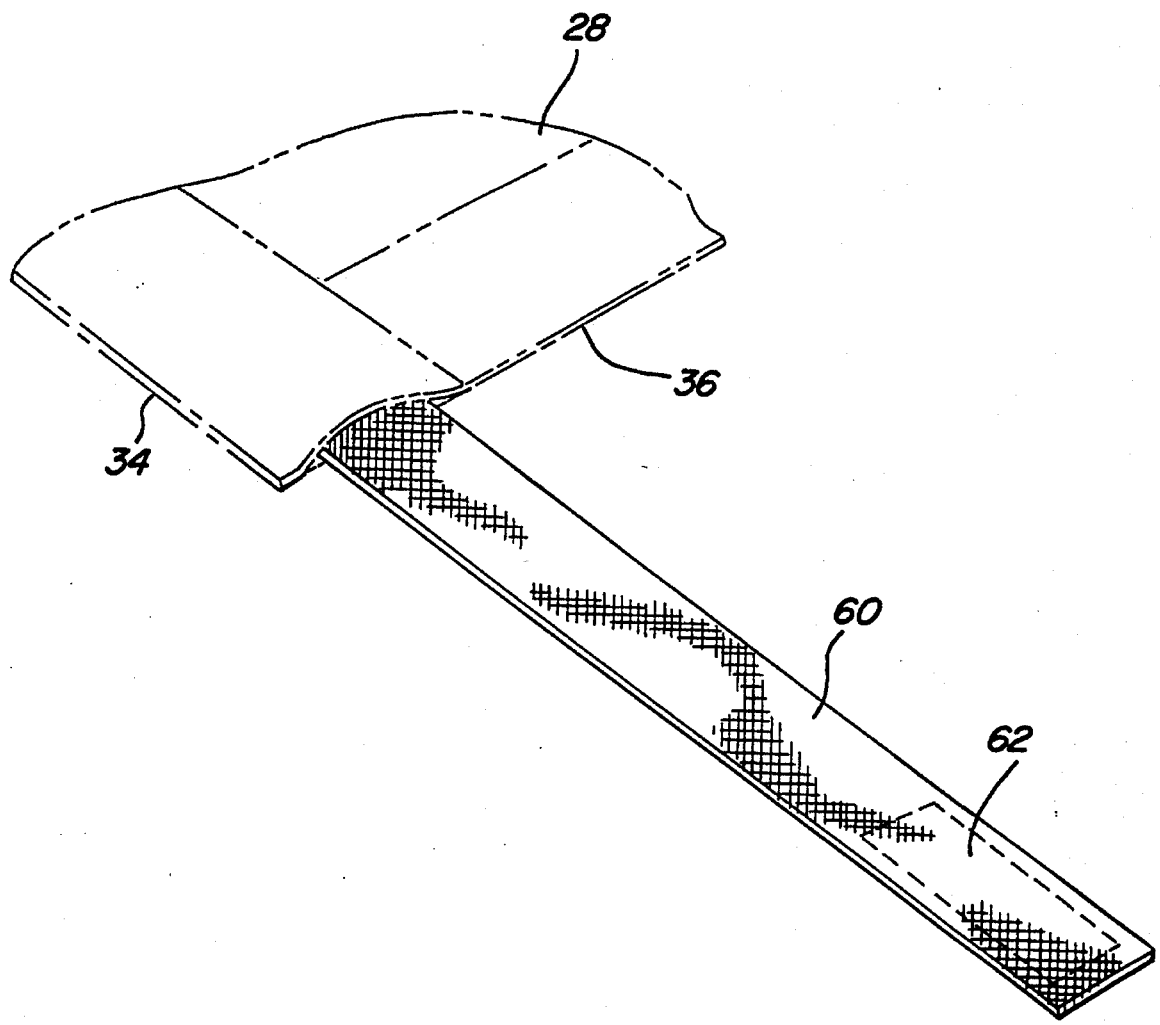
FIG. 9 is a perspective of a fastener member which may be included with the cargo cover as an alternative to the fastener members shown in FIGS. 7 and 8.

Referring now to FIG. 9, the fastener members 50 may also each comprise an elongate strap 60 having one end attached to the sheet 28 and a hook and loop (i.e., Velcro) fastener 62 disposed thereon adjacent the distal end thereof. Each strap 60 is extended about a respective one of the hook members 20, 22, with the hook and loop fastener 62 being releasably engaged to a complementary hook and loop fastener (not shown) attached to the bottom surface 32 of the sheet 28. Though the sheet 28 preferably includes four (4) fastener members 50 attached thereto, it will be recognized that more than four (4) fastener members 50 may be provided with the cargo cover 10 at different locations along the longitudinal and lateral side edges 34, 36 of the sheet 28.

Figure 2:
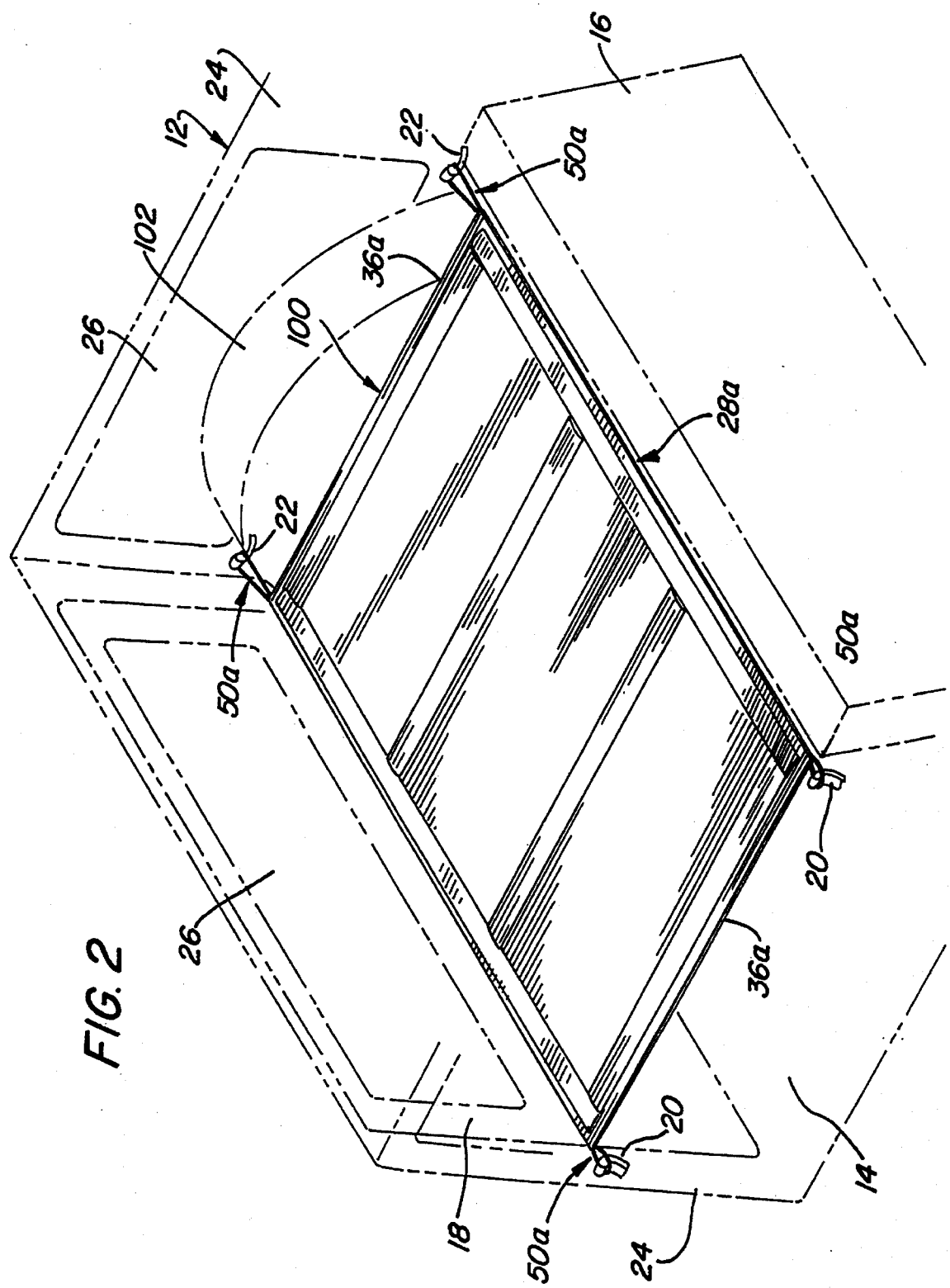
FIG. 2 is a front perspective view of a cargo cover constructed in accordance with a second embodiment of the present invention.

Referring now to FIG. 2, perspectively illustrated is a cargo cover 100 constructed in accordance with a second embodiment of the present invention. In the second embodiment, the cargo cover 100 is virtually identical to the cargo cover 10 previously described, with the primary difference being in the overall length of the sheet 28a thereof. In this respect, the sheet 28a of the cargo cover 100 is slightly shorter in length than the sheet 28 of the cargo cover 10 for purposes of accomodating a spare tire 102 stored within the cargo area 14. Wherein the cargo cover 10 is sized to extend between the opposed sidewalls 24 of the vehicle 12, the cargo cover 100 is sized to extend between one sidewall 24 and the spare tire 102. Since the sheet 28a of the cargo cover 100 extends only to the spare tire 102 and not to the adjacent sidewall 24, the fastener members 50a (i.e., the cords 52 or straps 54) extending from one of the lateral side edges 36a of the sheet 28a have a greater length than the fastener members 50a extending from the opposite lateral side edge 36a so as to be extensible over or about the hook members 22 disposed on opposite sides of the spare tire 102. As will be recognized, the cargo cover 100 will be oriented within the cargo area 14 such that the lateral side edge 36a including the fastener members 50a of greater length extending therefrom is disposed adjacent the spare tire 102.

Additional modifications and improvements of the present invention may also be apparent to those skilled in the art. Thus, the particular combination of parts described and illustrated herein is intended to represent only certain embodiments of the present invention, and is not intended to serve as limitations of alternative devices within the spirit and scope of the invention.

What is claimed is:

1. A cover releasably attached to an internal cargo area of a vehicle, comprising:

a plurality of stationary members attached along a perimeter of internal walls of said vehicle cargo area;

a pliable sheet having a substantially rectangular configuration defining opposed longitudinal side edges and opposed lateral side edges;

a first pair of stiffener members extending along respective longitudinal side edges of said sheet, each said longitudinal stiffener member having an arcuately contoured cross-section;

a second pair of stiffener members extending along respective lateral side edges of said sheet, each said lateral stiffener member having an arcuately contoured cross-section;

elongated pocket defined in said sheet for each one of said first and second pair of stiffener members, each pocket sized and configured to receive one stiffener member and seal the stiffener member within said pocket; and a plurality of fastener members attached to said pliable sheet for attaching to respective ones of said stationary members.

2. The cargo cover of claim 1 wherein each of said stiffener members is fabricated from plastic.

3. The cargo cover of claim 1 wherein each of said fastener members comprises an elongate strap having one end attached to said sheet and a buckle disposed thereon.

4. The cargo cover of claim 1 wherein each of said fastener members comprises an elongate strap having one end attached to said sheet and a hook and loop fastener disposed thereon.

5. The cargo cover of claim 1 wherein each of said fastener members comprises an elongate, elastic cord having opposed ends which are attached to said sheet in a manner causing said cord to assume a loop configuration.

6. The cargo cover of claim 1 wherein said sheet is fabricated from nylon.

7. The cargo cover of claim 6 wherein said sheet defines top and bottom surfaces, and said bottom surface is coated with a layer of rubberized material.

8. A foldable cargo cover releasably attached to an internal cargo area of a vehicle, comprising:

a plurality of stationary sheet members attached to internal walls of said vehicle;

a pliable sheet having a configuration configuration defining opposed longitudinal side edges and opposed lateral side edges;

a first pair of stiffener members extending along respective longitudinal side edges of said sheet, each stiffener member having an arcuately contoured cross-section;

a second pair of stiffener members extending along respective lateral side edges of the sheet, each stiffener member having an arcuately contoured cross-section a third pair of stiffener members extending perpendicularly in spaced relation between the first pair of stiffener members, each stiffener member having an arcuately contoured cross-section; and a plurality of fastener members attached to said sheet for attaching to respective ones of said stationary members and covering the internal cargo area.

9. The cargo cover of claim 8 further comprising four (4) elongate fastener members attached to respective corners of said sheet.

10. The foldable cover of claim 8 wherein said stiffener members are fabricated from plastic.

11. The foldable cover of claim 8 wherein said sheet is fabricated from nylon.

12. The foldable cover of claim 8 wherein said sheet defines top and bottom surfaces, and said bottom surface is coated with a layer of rubberized material.

13. The foldable cover of claim 8 wherein said sheet defines a plurality of pockets which are sized and configured to receive respective ones of said stiffener members, said stiffener members being sealed within said pockets.

* * * * *